United States Patent
Kopysc

(10) Patent No.: US 12,522,708 B2
(45) Date of Patent: Jan. 13, 2026

(54) BASALT FIBER REINFORCED SYNTACTIC THERMAL PROTECTION SYSTEM

(71) Applicant: Blue Origin Manufacturing, LLC, Huntsville, AL (US)

(72) Inventor: Adam Kopysc, Renton, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 129 days.

(21) Appl. No.: 18/303,044

(22) Filed: Apr. 19, 2023

(65) Prior Publication Data

US 2024/0352213 A1     Oct. 24, 2024

(51) Int. Cl.
*C08J 9/32* (2006.01)
*C08J 3/21* (2006.01)

(52) U.S. Cl.
CPC .................. *C08J 9/32* (2013.01); *C08J 3/212* (2013.01); *C08J 2363/00* (2013.01)

(58) Field of Classification Search
CPC ........... C08J 9/32; C08J 3/212; C08J 2363/00
USPC ....................................................... 523/218
See application file for complete search history.

(56) References Cited

U.S. PATENT DOCUMENTS

| | | | |
|---|---|---|---|
| 4,456,208 A | 6/1984 | Macconochie et al. | |
| 4,713,275 A | 12/1987 | Riccitiello et al. | |
| 6,293,496 B1 | 9/2001 | Moe | |
| 8,147,943 B1 | 4/2012 | Byrd et al. | |
| 2008/0070019 A1* | 3/2008 | Good | D06B 1/00 428/218 |
| 2013/0130016 A1* | 5/2013 | Hodgson | B32B 5/02 156/60 |
| 2016/0370498 A1* | 12/2016 | Liu | E21B 41/0021 |
| 2017/0260103 A1 | 9/2017 | Doud et al. | |
| 2020/0002030 A1 | 1/2020 | Brendel et al. | |

OTHER PUBLICATIONS

Blue Alchemist Technology Powers our Lunar Future, Blue Origin, Blog accessed at https://www.blueorigin.com/news/blue-alchemist-powers-our-lunar-future/, Feb. 10, 2023.

* cited by examiner

*Primary Examiner* — Hannah J Pak
(74) *Attorney, Agent, or Firm* — Summit Patents, PC

(57) ABSTRACT

Techniques and systems are used to fabricate portions of a thermal protection systems (TPS) for placement on or adjacent to a tank or other part of a structure, such as a spacecraft. The TPS may comprise syntactic foam as a spray-on foam insulation (SOFI)), which may be sprayed onto a surface. Alternatively, the TPS may comprise syntactic foam that is applied as preformed panels that are adhered or mechanically attached to a surface. Performance of a syntactic foam may be improved by including basalt fibers in a matrix material of the syntactic foam to make a basalt fiber reinforced syntactic TPS. The basalt fibers may be combined and interspersed with microspheres in the matrix material.

13 Claims, 3 Drawing Sheets

BASALT FIBER REINFORCED SYNTACTIC THERMAL PROTECTION SYSTEM

BACKGROUND

In space, long duration missions generally require a capability to store and maintain propellant throughout the mission. Cryogenic propellants, such as liquid oxygen and liquid hydrogen, are difficult to maintain due to heating in space, which causes these propellants to boil off. Moreover, storage tanks of such liquids may be subjected to extreme heat during a reentry phase of a mission. Thus, such storage tanks may be insulated by a thermal protection system (TPS) to protect their contents from heat transfer into and out of the tanks.

In addition to storage tanks, space vehicles may also use a TPS to inhibit the conduction of heat to the interior of the vehicle. For example, a TPS may include various materials applied externally to the outer structural skin of a space vehicle to maintain acceptable temperatures during reentry and other phases of flight. Materials used for a TPS are generally selected for their high-temperature stability and weight efficiency.

There is a general tradeoff between weight and mass of insulation and the insulative value that it provides. There continues to be a demand for insulating techniques and materials that can be used for space flight missions, for which relatively light weight and low mass (and sufficient strength) are very important design considerations.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

This disclosure describes a number of techniques and materials for providing thermal insulation to tanks or other portions of space vehicles. For example, some embodiments involve thermal protection systems (TPS) on or adjacent to the outside of a tank. In particular, syntactic foams, as a spray-on foam insulation (SOFI)), may be sprayed onto the tank surface or may be applied as preformed panels that are adhered or mechanically attached to the tank surface. Other than tanks, TPS may be applied to other portions of space vehicles.

A syntactic foam is a composite material comprising microspheres dispersed in a matrix material. The matrix material may be a metal or polymer, as explained below. The inclusion of microspheres, which may be hollow, generally results in a thermal (and sound) insulator having a relatively low density, high specific strength (e.g., strength divided by density), and a low coefficient of thermal expansion.

In various embodiments, performance of syntactic foams may be improved by including basalt fibers in the matrix material. Such a combination is herein called a basalt fiber reinforced syntactic TPS. Thus, for example, basalt fibers may be combined and interspersed with the microspheres. In some implementations, basalt fibers in a syntactic foam may be chopped and relatively short relative to the thickness of the syntactic foam applied as a TPS. The short, chopped basalt fibers may be randomly oriented, meaning that the directions of the longest dimension of each basalt fiber is randomly oriented in the matrix material. In other implementations, the short, chopped basalt fibers may be linearly oriented, meaning that the directions of the longest dimension of substantially all the basalt fibers are at least approximately aligned in a single direction. Such alignment may lead to a TPS having a direction-dependent strength, wherein the TPS is stronger along one axis versus another axis.

A basalt fiber reinforced syntactic TPS may provide a number of benefits, such as an improved ability to withstand high temperatures without excessive degradation of material properties, relatively high thermal and acoustic resistance, improved mechanical performance (e.g., compressive and shear strength, impact resistance, bending resilience, and so on), resistance to oxidation, and being lightweight. Also, basalt fibers may be fabricated by a relatively simple process of melting crushed basalt rock, which is abundant on earth and the moon, and subsequently extruding the fibers, allowing for a relatively low cost TPS. As another benefit, the mechanical strength of basalt is about 10 times higher than alumina fibers, for example. Alumina tensile strength is about 0.21 to 0.300 Giga Pascals (GPa) compared to 2.9 to 3.1 GPa for basalt.

Figure 1:
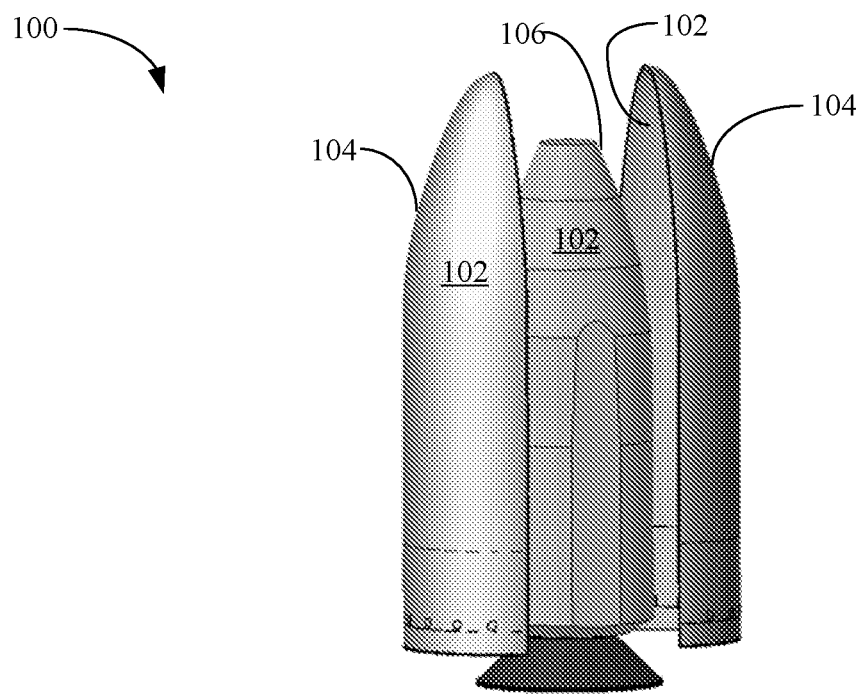
FIG. 1 illustrates portions of a spacecraft that includes a thermal protection system on fairings and a payload module, according to some embodiments.

FIG. 1 illustrates portions of a spacecraft 100 that includes a basalt fiber reinforced syntactic TPS 102 on fairings 104 and on a payload module 106, according to some embodiments. Spacecraft 102 is presented as an example of the types of structures or vehicles, particularly in the aerospace field, that may use a basalt fiber reinforced syntactic TPS. In some implementations, the TPS may act as an inner layer attached to an outer layer of a metal skin, such as aluminum or titanium. In such implementations, the TPS may also be used to absorb or dampen sound and vibration, such as during launch, for example.

In some embodiments, the basalt fiber reinforced syntactic TPS may be sprayed onto the surfaces of fairings 104 and payload module 106. In other embodiments, the basalt fiber reinforced syntactic TPS may be pre-formed panels that are attached onto surfaces of the fairings and payload module.

Figure 2:
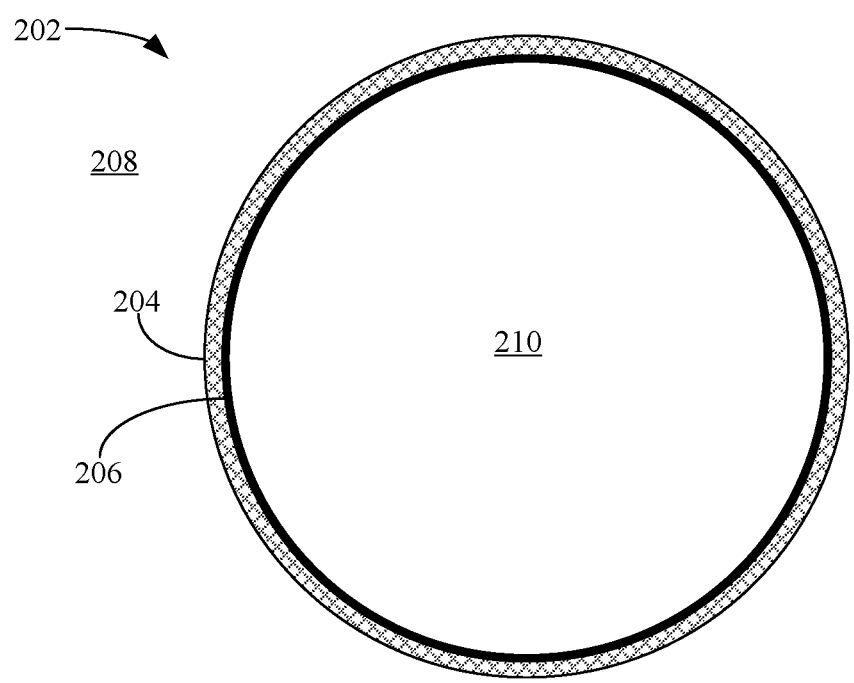
FIG. 2 is a cross-section of a tank covered with a thermal protection system, according to some embodiments.

FIG. 2 is a cross-section of a tank 202 covered with a basalt fiber reinforced syntactic TPS 204, according to some embodiments. For example, tank 202 may be a cryogenic tank to store liquid hydrogen or liquid oxygen. The circular cross-section may be representative of a spherical or cylindrical tank. Though a tank is used in this example, basalt fiber reinforced syntactic TPS may be applied onto the surface of other things, such as other parts of a space vehicle.

Claimed subject matter is not limited to the things onto which the basalt fiber reinforced syntactic TPS is applied. Tank 202 includes a metallic tank shell 206. The exterior surface of basalt fiber reinforced syntactic TPS 204 is exposed to outside 208 of tank 202 and the interior surface is exposed to contents 210 that may be stored in the tank.

In some embodiments, basalt fiber reinforced syntactic TPS 204 may be applied onto metallic tank shell 206 by a spray process, wherein the TPS material is stored and sprayed in a fluid state until it hardens on the metallic tank shell. In other embodiments, basalt fiber reinforced syntactic TPS 204 may comprise a number of pre-formed panels that are attached onto metallic tank shell 206.

Figure 3:
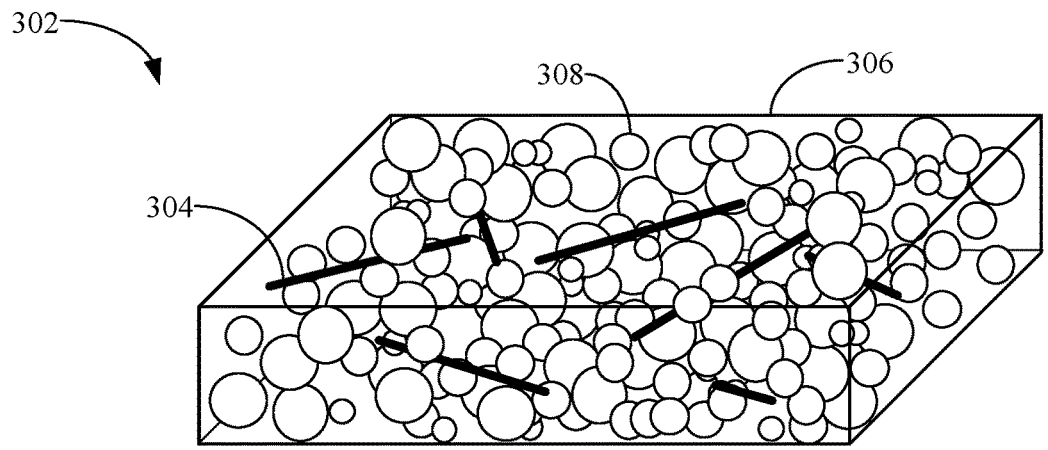
FIG. 3 is a schematic perspective view of a syntactic foam including basalt fibers, according to some embodiments.

FIG. 3 is a close-up schematic perspective view of a syntactic foam 302 including basalt fibers 304, according to some embodiments. Syntactic foam 302 comprises a matrix material 306 that includes microspheres 308 dispersed therein. As illustrated, microspheres 308 need not all have identical sizes, as described below. Matrix material 306 may be a polymer such as a thermoplastic (e.g., polyethylene, polypropylene, polystyrene, or nylon) or thermosetting plastic (epoxy resin, phenolic resin, cyanate esters, polyamides, or polyurethanes). In other embodiments, matrix material 306 may be a metal such as aluminum, magnesium, or titanium, among other metals. In yet other embodiments, matrix material 306 may be a ceramic such as carbon, zirconia, silicon carbide, silicon nitride, and so on.

Microspheres 308 may be evenly or non-evenly distributed in the matrix material. Microspheres 308 may comprise glass, cenospheres (e.g., hollow spheres made largely of silica and alumina), carbon, or polymers, just to name a few examples. Microspheres 308 may generally be distributed throughout matrix material 306 and have a relatively low thermal conductivity. Thus, when microspheres 308 are distributed in the matrix material, the overall thermal conductivity of the syntactic foam is lower than the thermal conductivity of the matrix material. In these implementations, the thermal conductivity of the microspheres is less than that of the matrix material. Microspheres 308, which may be hollow or solid, may have varying degrees of size and/or distribution in matrix material 306. For example, for various implementations, microsphere diameters may be in a range from several nanometers to hundreds of microns. In another example, microsphere concentration in a matrix material may be in a range from less than 1% to about 75% of the total foam volume.

In a syntactic foam, the matrix material may provide most of its tensile strength. Addition of basalt fibers 304 may increase the tensile strength. In some implementations, basalt fibers may be treated with a silanization process to allow the formation of strong bonds between the basalt fibers and an epoxy matrix. For example, basalt fibers may be silanized to increase the surface energy of the fibers for bonding and wet-out.

In some example embodiments, basalt fibers 304 may be relatively short, chopped fibers that are randomly distributed among microspheres 308. For instance, basalt fiber concentration in TPS material may range from about 30 to 40% by mass. A nominal formulation may contain about 33% by mass. Nominal fiber diameter may be 3-4 microns, though a range may be as high as 100-200 microns. Fiber length may be from about 0.0825 to 4 inches, depending on the application.

Figure 4:
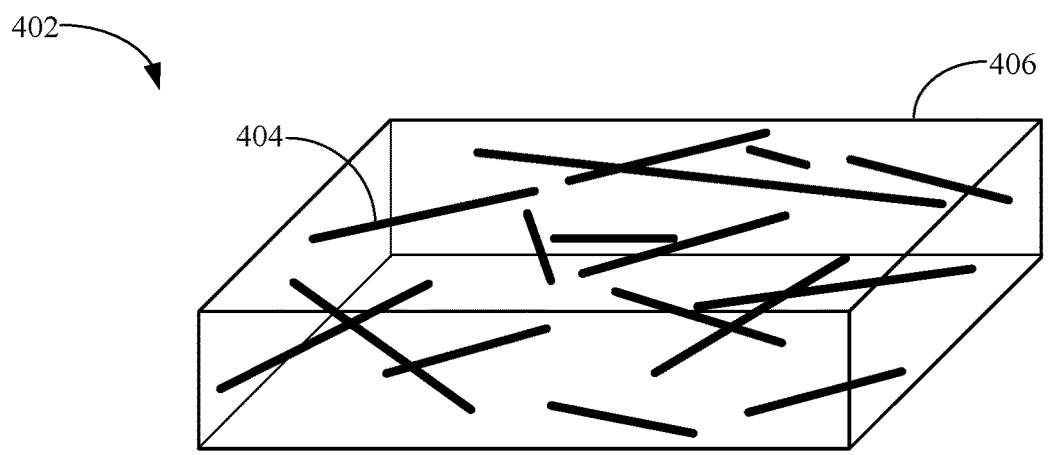
FIG. 4 is a schematic perspective view of a syntactic foam including randomly-oriented basalt fibers, according to some embodiments.

FIG. 4 is a schematic perspective view of a syntactic foam 402 including randomly-oriented basalt fibers 404 dispersed in a material matrix 406, according to some embodiments. For sake of clarity, microspheres are not illustrated, though they are also dispersed in material matrix 406, such as illustrated in FIG. 3.

As mentioned above, basalt fibers may be relatively short, chopped fibers that are randomly distributed among microspheres in the material matrix of a syntactic foam. In some embodiments, syntactic foam 402 may be in a liquid state, and in other embodiments, the syntactic foam may be in a solid or plastic state. In the liquid state, the relative positions of microspheres and basalt fibers in the material matrix are constantly changing. In the solid state, the relative positions of microspheres and basalt fibers in the material matrix are fixed. In a plastic state, however, the relative positions of microspheres and basalt fibers in the material matrix may be influenced by external forces (e.g., compression, tension, and shear), as described below.

Figure 5:
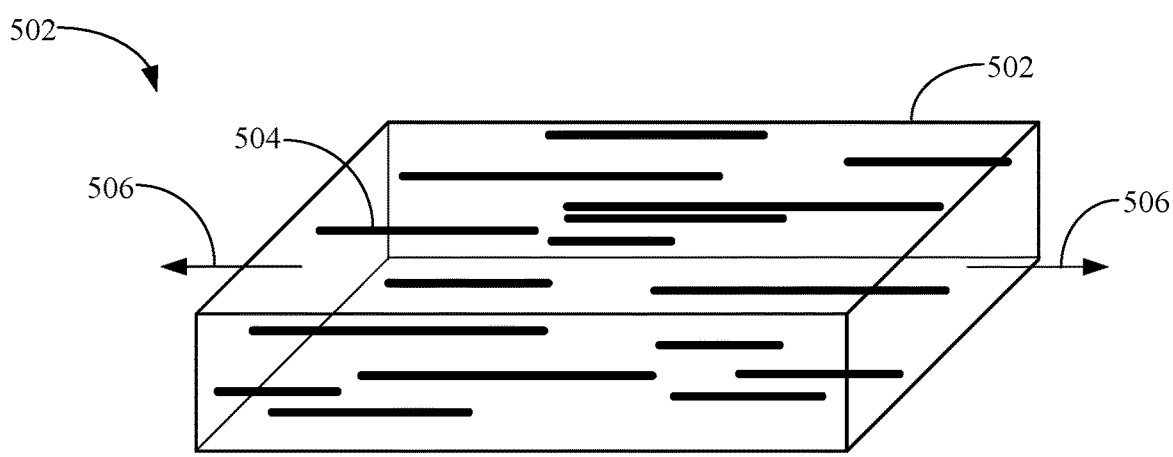
FIG. 5 is a schematic perspective view of a syntactic foam including linearly-oriented basalt fibers, according to some embodiments.

FIG. 5 is a schematic perspective view of a syntactic foam 502 including linearly-oriented basalt fibers 504, according to some embodiments. Generally, basalt fibers provide much of their strength and stiffness properties along the fiber axis direction. Thus, the orientation of basalt fibers in a syntactic foam may have a substantial impact on its mechanical properties without detrimentally affecting its thermal properties.

When basalt fibers are introduced into a liquid mixture of a material matrix and microspheres, the basalt fibers will not be oriented in any particular single direction, similar to or the same as that illustrated for basalt fibers 404 in syntactic foam 402. In some embodiments, a process to align the basalt fibers may involve a continuous and progressive change of orientation of the individual fibers by applying external forces to the bulk material (e.g., the syntactic foam). For example, the syntactic foam may be placed and maintained in a plastic state. During this state, tension 506 may be applied to syntactic foam 502 in the plastic state to at least partially align basalt fibers 504 with one another. In other words, the syntactic foam, in the plastic state, may be stretched and elongated. Such deformation of the macroscopic structure may generally lead to a general alignment of embedded fibers. In some implementations, the syntactic foam, in the case of nonmetallic matrix materials (e.g., epoxies), may begin in a liquid state and be subsequently placed into a plastic state by adding a catalyst to the syntactic foam. After a curing time, the syntactic foam will solidify from the plastic state to a rigid state. At this stage, for example, the rigid syntactic foam may be formed into panels.

In other embodiments, basalt fibers may be oriented in a matrix by assembling the matrix layer by layer with pre-soaked fibers in a sort of hybrid AFP (automated fiber placement). For example, each (and every) relatively thin layer of matrix material may include fibers aligned in a particular directions. The final assembled matrix, comprising multiple layers, may then include fibers that are all aligned in the particular direction.

In some implementations, the geometry of the fibers may be altered so that the fibers resemble a long hexagonal shape or a long oval shape. Such shapes may depend on extrusion type when fibers are made. In some cases, surface densification of varying depths from the outer mold line (OML) surface may be performed to increase surface mechanical performance. This can be done by using AFP, layering with altering densities of fiber/matrix mixture, or mechanically compacting the OML mechanically to reduce the porosity of the OML, just to name a few examples.

Figure 6:
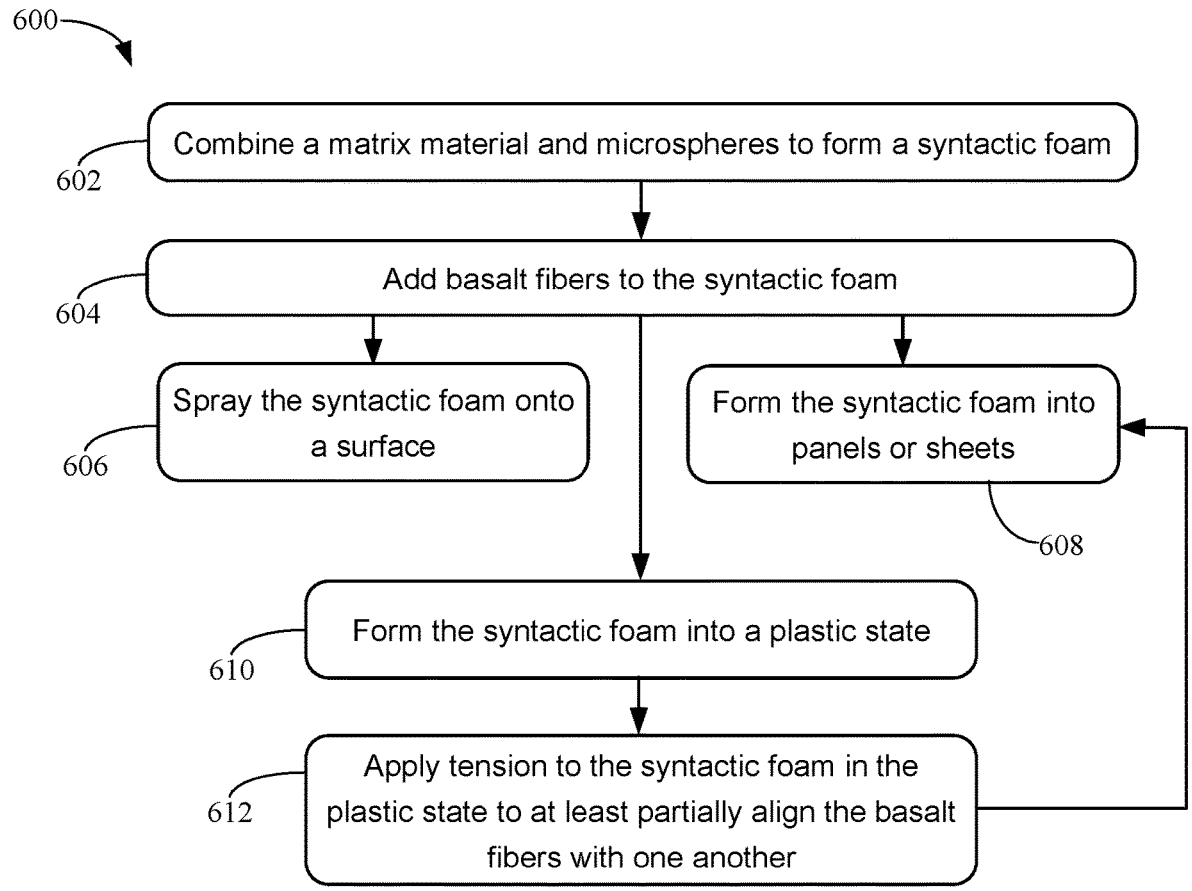
FIG. 6 is a flow diagram of a process for producing a thermal protection system, according to some embodiments.

FIG. 6 is a flow diagram of a process 600 for producing a thermal protection system, according to some embodiments. Process 600 may be performed by a fabricator, for example. Fabrication of basalt fiber reinforced syntactic foams involves the combining of a matrix material, hollow particles (e.g., microspheres), and basalt fibers. Additional materials may be introduced in some cases. The hollow particles may be engineered hollow particles or fly-ash cenospheres. The selection of particular materials may be based on their mechanical and thermal properties, compatibility with the matrix alloy, and cost, just to name a few examples.

In some embodiments, fabrication of rigid syntactic foams may involve blending of a filler and binder, filling a mold-cavity with the blended mixture, and implementing a cure process and post treatment. For example, in one particular embodiment, a syntactic foam may be produced by a vacuum-assisted mold filling technique, wherein a cavity is filled with microspheres, after which a binder is added under an applied vacuum to avoid creation of void spaces within the resulting matrix composite. Thereafter, the matrix composite is allowed to cure before post treatment. Process details may depend, at least in part, on filler and matrix type, binder type, cavity/mold formation, mixing and curing time, and post curing treatment, for example. In a particular example of sprayable syntactic foams, a liquid polymeric resin and hollow microspheres may be sprayed using separate adjustable streams such that both are mixed in the air just before reaching a destination surface or entering a mold. In some implementations, basalt fibers may be included in the liquid polymeric resin stream. In other implementations, basalt fibers may be included in the hollow microspheres stream.

Different parts of process 600 may involve various aspects of the processes described. For example, at step 602, the fabricator may combine a matrix material and microspheres to form a syntactic foam. Such combining may be via sprayed streams or simple mixing in a container or mold. At step 604, the fabricator may add basalt fibers to the syntactic foam. Subsequent to this step, several different process paths may be taken. For example, at step 606, the fabricator may spray the syntactic foam onto a surface (e.g., a fairing or hull or a spacecraft). In contrast, at step 608, the fabricator may form the syntactic foam into panels or sheets, which are at least semi-rigid, that may later be applied to a surface. In another path, at step 610, the fabricator may form the syntactic foam into a plastic state for a process to orient the basalt fibers in a preferred direction. In a plastic state, the syntactic foam can support tension (unlike a liquid), under which the syntactic foam will stretch and elongate, thereby at least partially aligning the basalt fibers. Thus, at step 612, the fabricator may apply tension to the syntactic foam in the plastic state to at least partially align the basalt fibers with one another. Subsequently, process 600 returns to step 608 where the syntactic foam, having at least partially aligned basalt fibers, is formed into panels or sheets.

Figure 7:
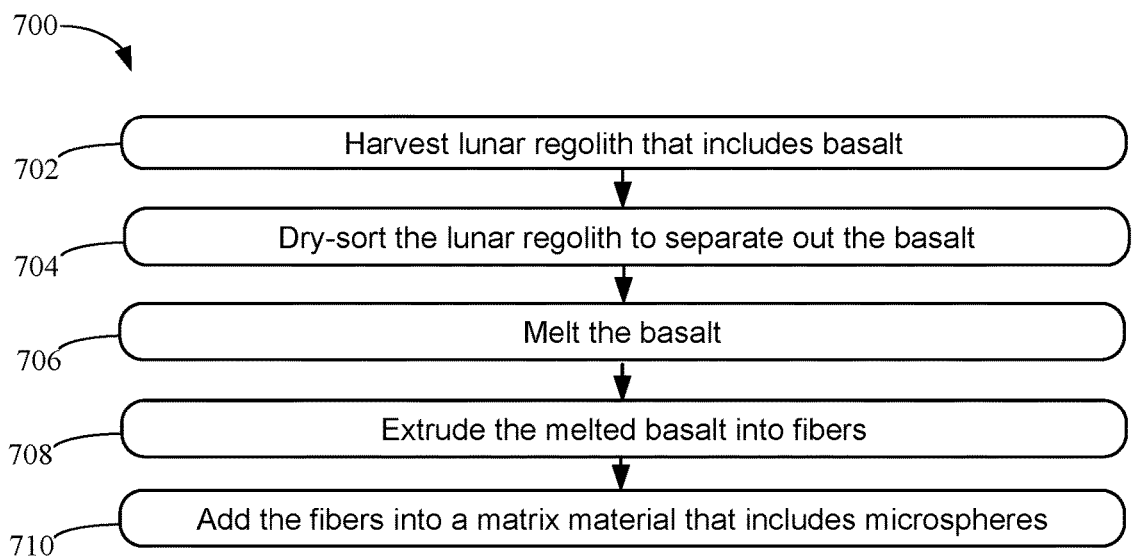
FIG. 7 is a flow diagram of a process for producing a fiber-reinforced syntactic foam from lunar regolith, according to some embodiments.

FIG. 7 is a flow diagram of a process for producing a fiber-reinforced syntactic foam from lunar regolith, according to some embodiments. Process 700 may be performed by a fabricator, for example.

Lunar regolith is known to have an abundance of basalt. At step 702, a fabricator may harvest the lunar regolith using any of a number of collection techniques. For example, one technique involves simple mechanical scooping while another technique involves a vacuum/pressure differential to pull regolith from moon surface deposits. At step 704, the fabricator may dry-sort the lunar regolith to separate out a substantial amount of the basalt. On earth, cleaning and separation of basalt from undesirable matter involves washing and sorting using water. On the moon, water is substantially unavailable. Dry-sorting lunar regolith may involve shaking, vibration, and agitation to inertially separate fragments of lunar regolith by mass and density. The separated basalt may then be crushed so it can be uniformly heated and melted in the next step.

At step 706, the fabricator may melt the basalt in a furnace, which may be at a temperature of about 1500 degrees C., for example. At step 708, the fabricator may extrude the melted basalt into fibers. For example, molten basalt may be extruded through nozzles to get continuous filaments of basalt fibers. In some implementations, the basalt fibers may be collected together to form bundled strands. In other implementations, the extruded basalt fibers may be cooled and chopped into relatively short pieces. Basalt fiber diameters may be in a range of about 10 to 20 microns, for example. At step 710, the fabricator may add the chopped fibers into a matrix material that includes microspheres to form a basalt fiber reinforced syntactic foam.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

I claim as follows:

1. A method of producing a thermal protection system, the method comprising:
   combining a matrix material and microspheres to form a syntactic foam;
   adding basalt fibers to the syntactic foam; and
   spraying the syntactic foam onto a surface.

2. The method of claim 1, wherein the basalt fibers are chopped basalt fibers.

3. The method of claim 1, wherein the matrix material is a silicone-based material.

4. The method of claim 1, further comprising silanizing the basalt fibers to increase the surface energy of the basalt fibers for bonding and wet-out.

5. The method of claim 1, further comprising silanizing the basalt fibers to allow formation of strong bonds between the basalt fibers and the syntactic foam.

6. The method of claim 1, wherein the concentration of the basalt fibers in the syntactic foam is in a range from about 30% to 40% by mass.

7. The method of claim 1, wherein concentration of the basalt fibers in the syntactic foam varies with depth from a surface of the syntactic foam.

8. A method of producing a thermal protection system that includes a syntactic foam, the method comprising:
   combining a matrix material and microspheres to form the syntactic foam;
   adding basalt fibers to the syntactic foam; and forming the syntactic foam into panels or sheets, wherein concentration of the basalt fibers in the syntactic foam varies with depth from a surface of the syntactic foam.

9. The method of claim 8, further comprising assembling the panels or sheets layer by layer to form the thermal protection system, wherein the basalt fibers are aligned substantially in the single direction.

10. A method of producing a thermal protection system, the method comprising:
   combining a matrix material and microspheres to form a syntactic foam;
   adding basalt fibers to the syntactic foam; and
   forming the syntactic foam into panels or sheets, each including the basalt fibers, which are aligned substantially in a single direction.

11. A method of producing a thermal protection system, the method comprising:
   combining a matrix material and microspheres to form a syntactic foam;
   adding basalt fibers to the syntactic foam; and
   forming the syntactic foam into a plastic state and applying tension to the syntactic foam in the plastic state to at least partially align the basalt fibers with one another.

12. The method of claim 11, wherein forming the syntactic foam into a plastic state comprises adding a catalyst to the syntactic foam.

13. The method of claim 10, further comprising assembling the panels or sheets layer by layer to form the thermal protection system.

* * * * *